Feb. 28, 1950 T. F. S. HARGREAVES 2,498,680

ALTERNATING CURRENT SIGNALING SYSTEM

Filed Aug. 30, 1948 3 Sheets-Sheet 1

INVENTOR.
THOMAS F.S. HARGREAVES
BY Robert Harding Jr.
ATTORNEY

Feb. 28, 1950 T. F. S. HARGREAVES 2,498,680

ALTERNATING CURRENT SIGNALING SYSTEM

Filed Aug. 30, 1948 3 Sheets-Sheet 2

INVENTOR.
THOMAS F. S. HARGREAVES

BY Robert Harding Jr.

ATTORNEY

Feb. 28, 1950 T. F. S. HARGREAVES 2,498,680

ALTERNATING CURRENT SIGNALING SYSTEM

Filed Aug. 30, 1948 3 Sheets-Sheet 3

INVENTOR.
THOMAS F. S. HARGREAVES
BY Robert Harding Jr.
ATTORNEY

Patented Feb. 28, 1950 2,498,680

UNITED STATES PATENT OFFICE 2,498,680

ALTERNATING CURRENT SIGNALING SYSTEM

Thomas Frederick Stanley Hargreaves, London, England, assignor to International Standard Electric Corporation, New York, N. Y., a corporation of Delaware Application August 30, 1948, Serial No. 46,753
In Great Britain September 23, 1947

6 Claims. (Cl. 178—66)

Figure 1:
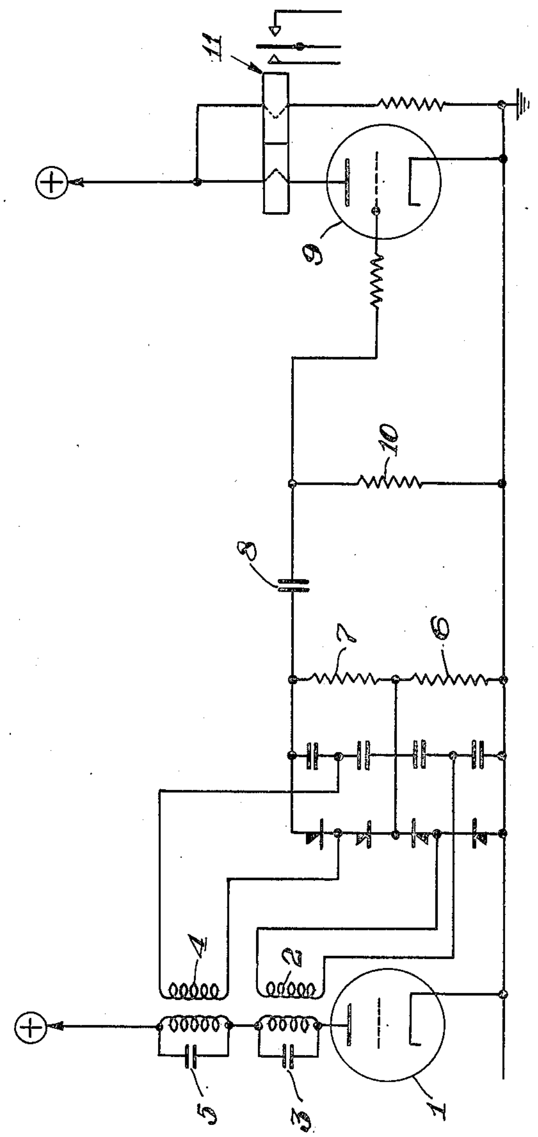

This invention relates to carrier frequency telegraph systems and more especially to receivers for systems employing phase modulation or frequency modulation. The code generally used in telegraph systems of the kind under consideration is built up of code elements of two kinds commonly known as mark and space elements. Although it is possible to transmit code signals by applying the carrier frequency to the transmission system to indicate code elements of one kind and suppressing the carrier frequency to indicate code elements of the other kind it is considered preferable to transmit definite signal indications of two different kinds to indicate the two kinds of code element. This is of particular importance when the transmission means is by radio as interference picked up at the receiving end while the transmitter carrier frequency is suppressed is liable to cause false signal indications.

In frequency modulated systems two different carrier frequencies are transmitted one indicating marks and one spaces. Such systems are commonly referred to as frequency shift systems as the frequency modulation only consists of altering the frequency of the carrier waves to one or other of two fixed frequencies.

In phase modulated systems the carrier frequency is not altered but it is shifted in phase to indicate the difference between marks and spaces.

The receiving system in either case essentially comprises a discriminator circuit for separating the two discrete frequencies in the case of frequency shift systems and for indicating the change of phase in the case of phase shift systems.

As the change of phase is in fact a momentary change of frequency the discriminator circuits for frequency or phase shift receivers are in fact very similar. The separation of the frequencies can be effected by means of resonant circuits as assumed in connection with the embodiment of the present invention described below or it can be effected by means of more elaborate band pass filters. In either case it can readily be seen that if the frequencies transmitted vary even marginally from their intended values the discriminator circuit will not deliver mark and spaces signals of equal amplitude to the subsequent stages of the receiving circuit, and there will be either marking or spacing bias.

The object of the present invention is to provide single and reliable means at the receiving end for removing the direct current bias caused by frequency errors at the transmitting end and for correcting the signal distortion which normally arises from the use of circuits having a finite time constant to suppress such direct current bias.

Thus in certain forms of phase modulated and frequency modulated carrier telegraph systems the D. C. component of the telegraph signal is lost either because of inherent characteristics of the transmission means or receiving apparatus or because it is desirable for other reasons to insert a blocking condenser in the D. C. portion of the receiving circuit.

In frequency shift radio-telegraph systems it is necessary to use either extremely accurate oscillators, or to use complicated automatic frequency correcting means, or to use a blocking condenser to cut out the D. C. bias component produced by the discriminator in response to frequency errors.

There is also a phase modulation system in which phase shifts of about $\pm 90°$ are used to indicate the changes from mark to space or space to mark. One of the simplest means of receiving is to use a discriminator (which gives an impulse at each phase shift) followed by an integrating circuit. If the integrating circuit has a finite time-constant the D. C. component is again lost. The effect of this loss of the D. C. component is that (*a*) The output dies away during a long mark or space and the apparatus becomes sensitive to comparatively small amounts of interference, (*b*) The first signal or signals after a long mark or space tend to have a high distortion.

The invention provides a receiver for use with frequency or phase modulated telegraph systems comprising a main signal path, means controlled by the currents passing through the receiving relay windings for separately deriving rectified signals from the originally received modulated signals and passing these separately derived signals through a network designed to compensate for any distortion occurring in the main signal path and means for combining said separately derived signals with those passing over the main path whereby compensation for such distortion is effected.

Figure 2:
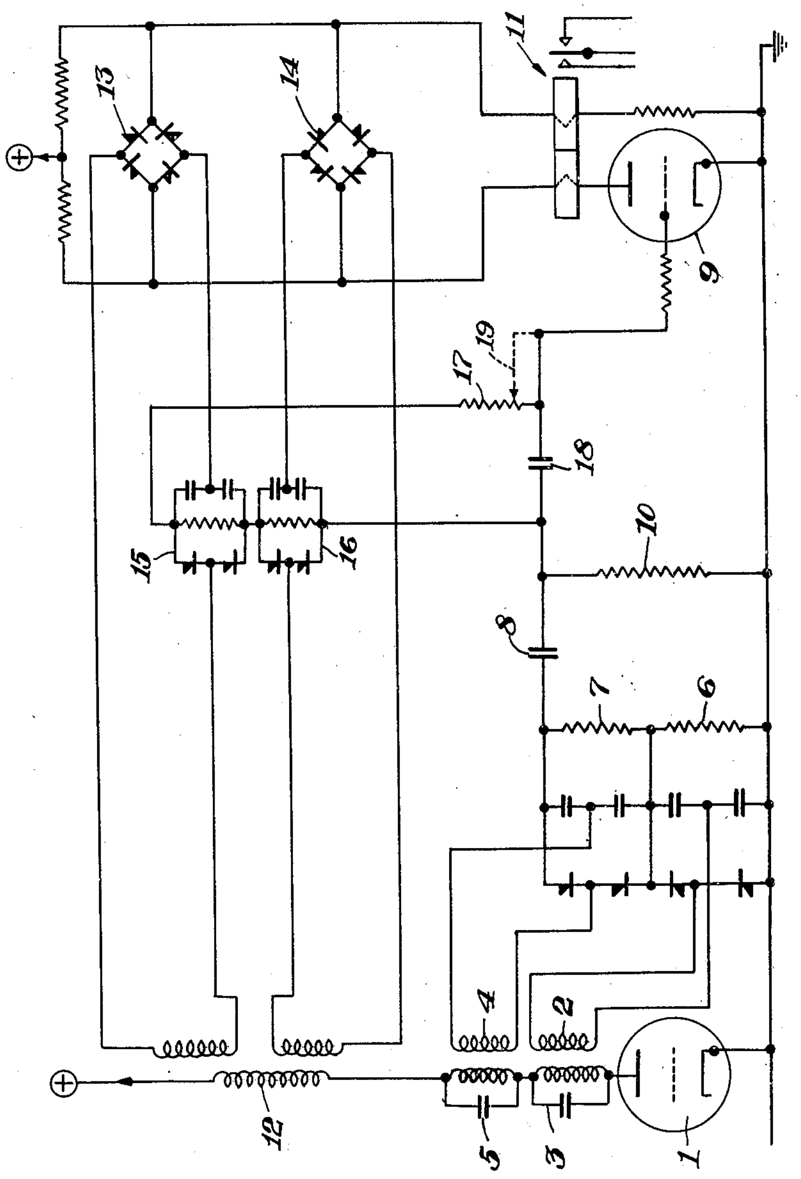
Figure 3:
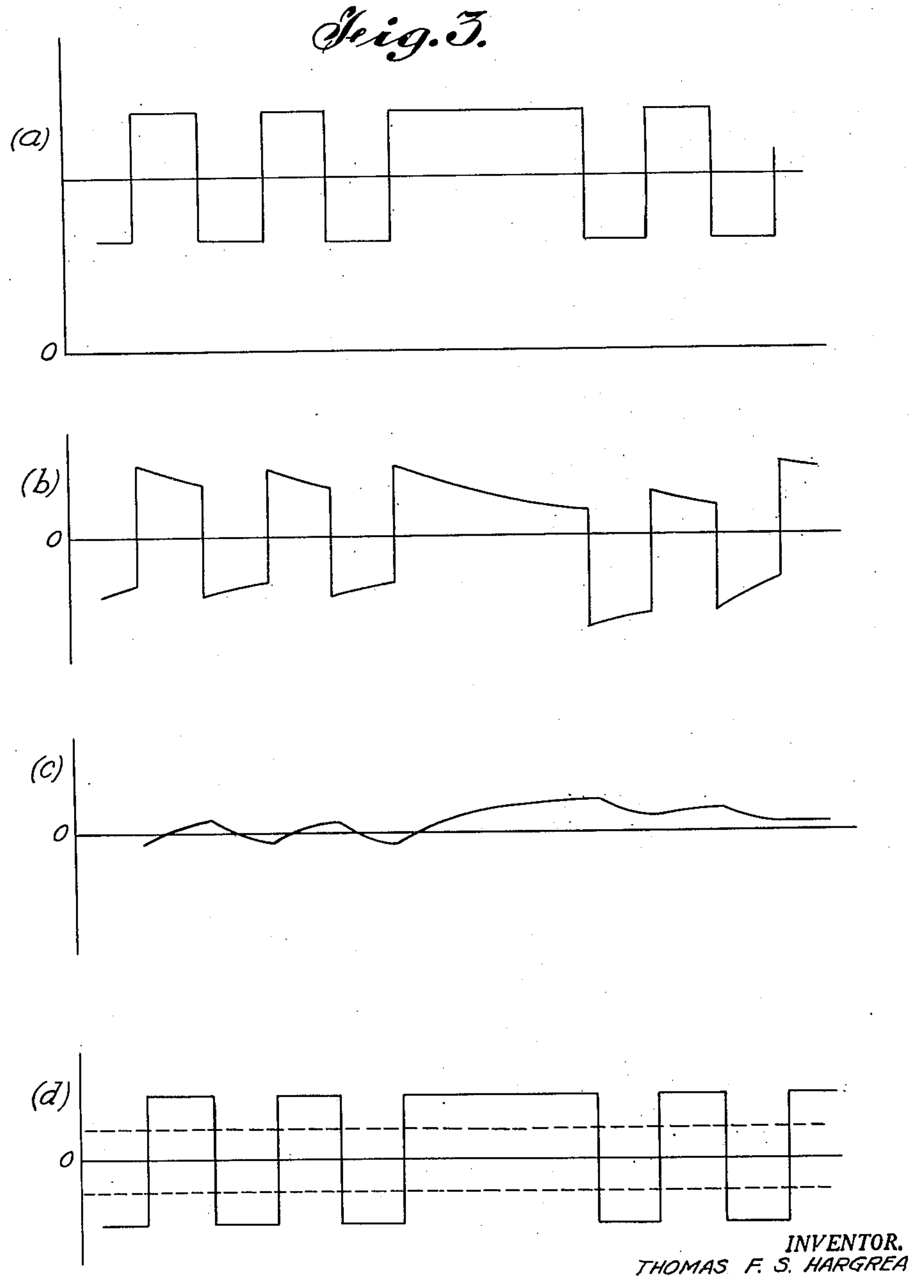

For a better understanding of the invention the following description of one embodiment as applied to a frequency shift receiver should be read in conjunction with the accompanying drawings in which:

Fig. 1 is a schematic representation of a portion of a frequency shift telegraph receiver, Fig. 2 shows the same circuit as Fig. 1 with the addition of the correcting circuit according to the invention, and Fig. 3 gives diagrams of received signal shapes illustrating the working of the correcting circuit.

In Fig. 1 a limiter valve 1, to which the amplified received signals are applied, feeds a discriminator composed of two tuned circuits in series, the tuned circuits comprising a transformer 2 associated with condenser 3 and a transformer 4 associated with condenser 5 respectively and associated rectifier circuits producing D. C. outputs across resistances 6 and 7.

The output of the discriminator is applied via the blocking condenser 8 to the grid of the D. C. output valve 9. Resistance 10 is a leak resistance. The anode current of valve 9 passes through one winding of the polarized receiving relay 11. The other winding carries a biasing current arranged to hold the armature of the relay on the back contact when the anode current of valve 9 is cut off. For the purposes of this description the two windings of the relay will be considered to be similar and the biasing current to be equal to half the anode current passed by valve 9 when in the conducting condition. The driving voltage swing applied to the grid of valve 9 will be arranged to be sufficient to cut off the anode current for one condition (say the marking condition) and give full anode current for the other (spacing) condition.

Consider the operation of the circuit when signals are being received and there is an error of frequency superimposed.

The output of the discriminator as measured across resistances 6 and 7 will be of the form shown in Fig. 3A (except that ideally square signals have been shown in order to simplify the following description) i. e. there will be a D. C. voltage corresponding to the frequency error of the incoming signals (shown very large here), and superimposed upon it will be the variations in accordance with the incoming telegraph signals. The output across resistance 10 has this D. C. bias component removed as shown in Fig. 3B, but also, owing to the finite time-constant of the circuit comprising resistance 10 and condenser 8 tends to die away towards zero as shown. Means is provided according to the present invention whereby a voltage or current which is so arranged that it builds up at the same rate and by the same amount, as the decay caused by the time-constant of the circuit formed by resistance 10 and condenser 8 is applied to the grid of valve 9. This result is obtained by using part of the output of the limiter valve 1 switching it in accordance with the received signal, passing it through a time-constant circuit inverse to that in the main path and then adding the result to the output of the main path.

Fig. 2 shows an application of the invention to the circuit of Fig. 1. Transformer 12 takes part of the output of the limiter valve 1 and supplies it via the switching rectifier bridges 13 and 14 to the rectifying circuits 15 and 16 which are oppositely poled. Rectifier bridges 13 and 14 are so connected that when valve 9 passes anode current (spacing condition) bridge 14 carries current in the forward direction, thus making it a low impedance whilst bridge 13 has reverse voltage applied to it thus making it a high impedance. Conversely, when the anode current of valve 9 is cut off (marking condition), bridge 13 is made low and bridge 14 a high impedance. Thus during a space alternating carrier frequency current is passed from transformer 12 via bridge 14 to rectifier circuit 16 which produces a negative output and during a mark alternating carrier frequency current passes from transformer 12 via bridge 13 to rectifier circuit 15 which produces a positive output. These outputs are applied via resistance 17 and condenser 18 connected in the grid circuit of a valve 9. If the time-constant of the circuit consisting of a resistance 17 and condenser 18 is made equal to that of the circuit consisting of resistance 10 and condenser 8 the output across condenser 18 will build up with the same time-constant as that at which the output across resistance 10 decays, and thus can be made to correct for the latter as shown in Figs. 3C and 3D, in which the trace in Fig. 3C is the output across condenser 18 and the trace in Fig. 3D is the sum of the traces in Figs. 3B and 3C and represents the resultant voltage applied to the grid of a valve V9. In actual practice whilst the voltage across condenser 18 will be shown in Fig. 3C, the signal output will have a rounded contour due to the finite bandwidth of the receiver and hence the compensation will not be as complete as is shown in Fig. 3D but will be a sufficiently good approximation to give low distortion during signalling and will, of course, maintain the control of valve 9 correctly during long marks or spaces.

A further desirable effect is very easily obtained when using this invention.

With normal design of the output circuit and receiving relay the latter will change over when the controlling voltage applied to the grid of valve 9 passes through the zero line of Figure 3D. Thus a false signal of amplitude sufficient to pass just beyond the zero line can cause the relay to respond. Some additional protection against such false signals is obtained by arranging that the changeover does not take place unless the voltage goes substantially beyond the zero line, i. e. to the dotted lines of Figure 3D. This effect can be obtained by using thyratrons or suitable trigger circuits in place of valve 9 but for satisfactory operation this requires fairly close tolerances on the discriminator output and the changeover voltage required by the output stage as these may vary in opposite directions as valves age etc.

By adding some of the output of the rectifier circuits 15 and 16 without passing it through the time constant circuit the same effect can readily be obtained with a normal arrangement of valve 9 and the receiving relay and in this case variations of output of valve 1 will affect the discriminator and the switched output equally and hence the position of the dotted lines of Figure 3D relative to the main output will be unchanged. This effect is obtained automatically by including part of the voltage across resistance 17 in the grid circuit of valve 9 as shown by the dotted connection 19 in the figure and suitably increasing the outputs of rectifier circuits 15 and 16.

I claim:

1. A receiver for use with frequency or phase modulated telegraph systems using mark and space signals comprising a first time constant circuit for removing any permanent direct current bias component in the rectified received signals, two rectifier bridges, means for controlling said two bridges whereby one is conducting during the reception of mark signals and the other is conducting during the reception of space signals, one only of said bridges being conducting at a time, separate full wave rectifiers, means for applying the originally received modulated mark and space signals separately each through one of said rectifier bridges to separate ones of said full wave rectifiers, means for deriving signal voltages from both of said last mentioned rectifier units, and means for applying said voltages through a second time constant circuit to the receiver output circuit in such manner as to compensate for any diminution of the amplitude of the signals delivered through said first time constant unit.

2. A receiver according to claim 1, in which said first time constant circuit is constituted by a condenser in series with, and a resistance in shunt across the path of said rectified received signals and in which said second time constant circuit is constituted by a resistance in series with and a condenser in shunt across the path of said derived signal voltages.

3. A receiver according to claim 2 in which said first and second time constant circuits are so designed as to have the same time constant.

4. A receiver for use with frequency or phase modulated telegraph systems of the kind comprising a discriminator consisting of tuned circuits or filters in conjunction with rectifying means for separating the received carrier frequency mark and space signals, means for delivering said rectified and discriminated signals through a first condenser in series and a first resistance in shunt as voltage of opposite polarities to the control grid of an output valve, said valve conductively responsive to application of a voltage of only one of said polarities, a receiving relay having a first winding in the anode current path and a second winding, a source of opposing biasing current of less effective value than the anode current, means for applying said biasing current continuously to said second winding, two quadralateral rectifier bridges each having a first diagonal connected between corresponding points in the paths through said windings, means for applying the original received modulated carrier frequency signals across second diagonals of said bridges, said respective bridges offering a low and high impedance to the passage of said original received modulated carrier frequency signals according as current passes or does not pass through said first winding, means for rectifying said carrier frequency signals passing said bridges, means for passing said last mentioned rectified signals through a second condenser in shunt, and a second resistance in series, said second condenser and second resistance having a time constant equal to that of the first condenser and first resistance, said second condenser being in series with said first condenser in the connection to the control grid of said output valve whereby any diminution of the amplitude of said signals caused by the presence of said first condenser and first resistance is compensated.

5. A receiver according to claim 4, comprising in addition means for deriving a suitably adjusted portion of grid rectified signals from said quadralateral rectifier bridges, and means for applying said portion of signals to the control grid of said output valve in such a manner that the polarity applied to said control grid will not change over until the current in the main signal path has changed by a predetermined amount.

6. A receiver according to claim 5, in which said portion of said rectified signals is obtained by means of an adjustable tapping on said second resistance, said tapping being connected to the lead which connects said second condenser to said control grid.

THOMAS FREDERICK STANLEY HARGREAVES.

REFERENCES CITED

The following references are of record in the file of this patent:

UNITED STATES PATENTS

| Number | Name | Date |
|---|---|---|
| 2,254,114 | Wilson | Aug. 26, 1941 |

FOREIGN PATENTS

| Number | Country | Date |
|---|---|---|
| 343,516 | Great Britain | Feb. 20, 1931 |